US012604098B2

(12) United States Patent
Ollila et al.

(10) Patent No.: US 12,604,098 B2
(45) Date of Patent: Apr. 14, 2026

(54) DEVICE AND METHOD FOR EXPOSURE CORRECTION USING A LOW-RESOLUTION BRIGHTNESS MAP

(71) Applicant: Varjo Technologies Oy, Helsinki (FI)

(72) Inventors: Mikko Ollila, Tampere (FI); Ville Timonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 145 days.

(21) Appl. No.: 18/645,558

(22) Filed: Apr. 25, 2024

(65) Prior Publication Data

US 2025/0338028 A1 Oct. 30, 2025

(51) Int. Cl.
| | |
|---|---|
| *H04N 23/73* | (2023.01) |
| *G06F 3/01* | (2006.01) |
| *G06V 10/25* | (2022.01) |
| *G06V 10/60* | (2022.01) |
| *G06V 10/82* | (2022.01) |
| *H04N 23/76* | (2023.01) |

(52) U.S. Cl.
CPC ............. *H04N 23/73* (2023.01); *G06F 3/013* (2013.01); *G06V 10/25* (2022.01); *G06V 10/60* (2022.01); *G06V 10/82* (2022.01); *H04N 23/76* (2023.01)

(58) Field of Classification Search
CPC ........ H04N 23/73; H04N 23/76; G06F 3/013; G06V 10/25; G06V 10/60; G06V 10/82
See application file for complete search history.

(56) References Cited

U.S. PATENT DOCUMENTS

| | | | |
|---|---|---|---|
| 2015/0244923 A1* | 8/2015 | Lee ...................... | H04N 25/583 |
| | | | 348/234 |
| 2017/0324909 A1* | 11/2017 | Choi .................... | H04N 23/741 |
| 2018/0095533 A1* | 4/2018 | Song .................... | H04N 23/698 |
| 2024/0089605 A1* | 3/2024 | Pillans .................. | H04N 23/73 |

* cited by examiner

*Primary Examiner* — Gevell V Selby
(74) *Attorney, Agent, or Firm* — Ziegler IP Law Group, LLC.

(57) ABSTRACT

Disclosed is method for exposure correction. The method includes receiving at least one image; defining a low-resolution brightness map, associated with the at least one image, corresponding to an ambient lighting condition in which the at least one image is captured; and correcting an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image.

13 Claims, 2 Drawing Sheets

DEVICE AND METHOD FOR EXPOSURE CORRECTION USING A LOW-RESOLUTION BRIGHTNESS MAP

TECHNICAL FIELD

The present disclosure relates to methods for exposure corrections. Moreover, the present disclosure relates to head-mounted display devices.

BACKGROUND

In recent times, High Dynamic Range (HDR) imaging has become increasingly essential in modern imaging systems to accurately reproduce a wide range of luminance levels present in real-world scenes. However, implementing the HDR functionality in Extended Reality (XR) headsets presents unique challenges due to constraints of existing image sensor technologies and the demanding nature of XR environments.

The present solutions for HDR video capture and display techniques involve specialized components and complex systems, which are expensive and difficult to implement in XR headsets. Conventional image sensors lack the necessary features, such as HDR pixels or dedicated analog-to-digital conversion systems, to efficiently capture and process HDR content. Moreover, the present solutions often rely on multi-exposure or gain systems, leading to increased data processing requirements and reduced frame rates, which are impractical for real-time XR applications. Furthermore, the present solutions results in overexposed or underexposed pixels in the images, where the overexposed or underexposed pixels can disrupt an illusion of reality in XR environments and diminish the user experience, particularly in scenes with high luminance variations.

Therefore, in light of the foregoing discussion, there exists a need to overcome the aforementioned drawbacks.

SUMMARY

The aim of the present disclosure is to provide a method and a head-mounted display device to remove inaccurate illumination in at least one image. The aim of the present disclosure is achieved by a method and a head-mounted display device for exposure correction as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
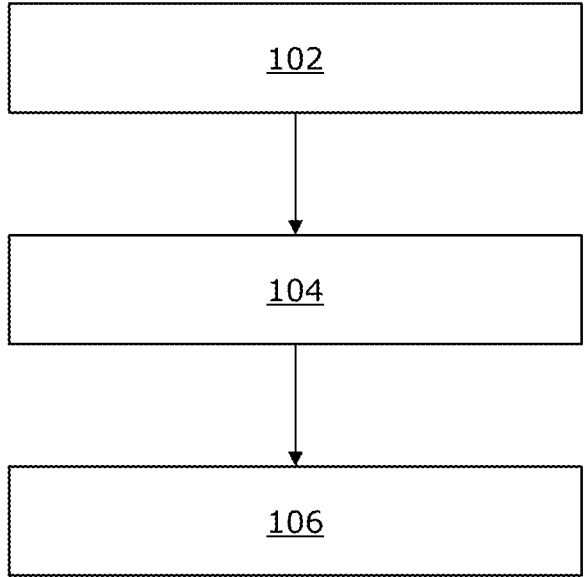
FIG. 1 is an illustration of a flowchart depicting steps of a method for exposure correction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for exposure correction, the method comprising:

receiving at least one image;

defining a low-resolution brightness map, associated with the at least one image, corresponding to an ambient lighting condition in which the at least one image is captured; and correcting an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image.

The present disclosure provides an aforementioned method that significantly improves exposure correction in the at least one image. Moreover, restoring the at least one inaccurately-illuminated area of the at least one image effectively prevents overexposure or underexposure of pixels in the at least one image. Furthermore, accurately restoring the at least one inaccurately-illuminated area of the at least one image enables the at least one image suitable for use in extended reality (XR) applications.

In a second aspect, the present disclosure provides a head-mounted display device (100) comprising:

at least one camera for capturing at least one image; and a processor operatively coupled to the at least one camera, wherein the processor is configured to:

receive the at least one image;

define a low-resolution brightness map, associated with the at least one image, corresponding to an ambient lighting condition in which the at least one image is captured; and correct an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image.

The present disclosure provides an aforementioned head-mounted display device that significantly improves exposure correction in the at least one image. Moreover, restoring the at least one inaccurately-illuminated area of the at least one image effectively prevents overexposure or underexposure of pixels in the at least one image. Furthermore, accurately restoring the at least one inaccurately-illuminated area of the at least one image enables the at least one image suitable for use in extended reality (XR) applications.

Throughout the present disclosure, the term "exposure correction" refers to a process of adjusting and managing the exposure in the at least one image for maintaining a constant level of brightness in the at least one image. Throughout the present disclosure, the term "image" refers to a visual representation of an environment (which may be a real-world environment or an extended reality environment) viewed by a user that is captured by a camera or an imaging sensor. It will be appreciated that the "at least one image" refers to "single image" in some implementations, and "a plurality of images" in other implementations. Optionally, the at least one image comprises a first image and a second image, wherein the first image is captured by a first camera corresponding to a first eye of the user, and the second image is captured by a second camera corresponding to a second eye of the user, wherein the first image and the second image are used to generate a stereo image. Optionally, the at least one image is received from at least one camera or at least one sensor that is used to capture the at least one image. Alternatively, the at least one image is received from a data repository in which the at least one image is pre-stored.

Throughout the present disclosure, the term "low-resolution brightness map" refers to a data structure comprising information pertaining to how much brightness to be set for each pixel in the at least one image to replicate a lighting present in the environment depicted in the at least one image. For example, the low-resolution map is defined for that least one image having a size of 50×50 pixels. Notably, the brightness map being low-resolution enables to make any alignment errors between the at least one image and the brightness map insignificant. Optionally, a resolution of the low-resolution brightness map lies between a range of 8×8 to 1920×1280 pixels. Optionally, the resolution of the low-resolution brightness map is same as a resolution of the at least one image. Throughout the present disclosure, the term "ambient lighting condition" refers to an information that is indicative of characteristics of the lighting (such as an intensity, a distribution, an angle, a type of the lighting and the like) present in the environment in which the at least one image is captured. Notably, defining the low-resolution brightness map being corresponding to the ambient lighting condition implies that the information about how much brightness is to be set for each pixel in the at least one image is based on how much lighting is received by each region of the environment in which the at least one image is captured.

Optionally, the method further comprises one of:
  obtaining ambient light data, corresponding to the ambient lighting condition in which the at least one image (202) is captured, for defining the low-resolution brightness map (204),
  generating ambient light data, by using pre-determined data corresponding to the ambient lighting condition in which the at least one image is captured, for defining the low-resolution brightness map.

In this regard, the term "ambient light data" refers to sensed data that is indicative of the ambient lighting condition in which the at least one image is captured. Optionally, the ambient light data is obtained from a data repository or a cloud based server. Notably, processing the obtained ambient light data enables to determine the indication of the ambient lighting condition that is present in the ambient light data, and subsequently, the low-resolution brightness map is defined corresponding to the ambient lighting condition (determined from the ambient light data) in which the at least one image is captured. Optionally, the ambient light data is obtained when the ambient light data is already present in a pre-existing form. Alternatively, the ambient light data is generated, using the pre-determined data corresponding to the ambient lighting condition, when the ambient light data is not present in the pre-existing form. Throughout the present disclosure, the term "pre-determined data" refers to that data related to the ambient lighting condition, which is suitable for generating the ambient light data. A technical effect is that the low-resolution brightness map is effectively and accurately defined corresponding to the ambient lighting condition, irrespective of whether the ambient light data is obtained or generated.

Optionally, the low-resolution brightness map is defined as a matrix of target brightness values, one for each pixel in the at least one image, and wherein a given target brightness value corresponding to each pixel is one of:
  an average-brightness value determined using brightness values of all pixels in any one of: the at least one image, at least one previously-captured image,
  a brightness value determined based on an exposure level corresponding to each pixel in any one of: the at least one image, at least one previously-captured image.

In this regard, the term "target brightness values" refers to a collection of numerical values of how much brightness is to be set for each pixel in the at least one image, where each target brightness value is for a corresponding pixel in the at least one image. Optionally, the target brightness values may be one of: target illuminance values, target luminance values. Notably, the target brightness values are determined according to the ambient lighting condition. It will be appreciated that the low-resolution brightness map being defined as the matrix of the target brightness values implies that the data structure in which the target brightness values are stored is a matrix. Throughout the present disclosure, the term "given target brightness value" refers to a specific value from the matrix of the target brightness values for the corresponding pixel in the at least one image. Notably, the given target brightness value corresponding to each pixel in the at least one image is a separate value present in the matrix of the target brightness values. Throughout the present disclosure, the term "at least one previously-captured image" refers to at least one specific image that is captured at a previous time instance in comparison to a time instance at which the at least one image is captured. Throughout the present disclosure, the term "average-brightness value" refers to a brightness value that is calculated as a numerical average of the brightness values (namely, luminance values) of all the pixels either in the at least one image, or in the at least one previously-captured image. Optionally, the luminance value of a pixel is calculated by calculating a numerical average of R (Red), G (Green) and, B (Blue) values of the pixel (i.e., $(R+G+B)/3$). Alternatively, the luminance value of the pixel is calculated using a mathematical formula of $(0.2126 \times R)+(0.7152 \times G)+(0.0722 \times B)$. Notably, the given target brightness value being the average-brightness value implies that an overall brightness of all the pixels in any one of: the at least one image, the at least one previously-captured image is used to determine the given target brightness value corresponding to each pixel. Throughout the present disclosure, the term "exposure level corresponding to each pixel" refers to an amount of light received by each pixel while any of: the at least one image, the at least one previously-captured image is captured. Notably, the given target brightness level being the brightness level determined based on the exposure level corresponding to each pixel implies that the amount of light received by each pixel while any of: the at least one image, the at least one previously-captured image is captured is used to determine the given target brightness value. A technical effect is that the low-resolution brightness map is effectively and accurately defined.

Throughout the present disclosure, the term "inaccurately-illuminated area" refers to said area in the at least one image whose brightness does not accurately replicate the lighting that is received by said corresponding region of the environment which is depicted in the said area in the at least one image. It will be appreciated that the "at least one inaccurately-illuminated area" refers to "single inaccurately-illuminated area" in some implementations, and "a plurality of inaccurately-illuminated area" in other implementations. Optionally, the method further comprises determining the at least one inaccurately-illuminated area of the at least one image, based on at least one predefined illumination threshold. Throughout the present disclosure, the term "under-illuminated area" refers to said area in the at least one image whose brightness is lower than the lighting that is received by said corresponding region of the environment which is depicted in the said area in the at least one image. It will be appreciated that the "at least one under-illuminated area" refers to "single under-illuminated area" in some implementations, and "a plurality of under-illuminated area" in other implementations. Throughout the present disclosure, the term "over-illuminated area" refers to said area in the at least one image whose brightness is greater than the lighting that is received by said corresponding region of the environment which is depicted in the said area in the at least one image. It will be appreciated that the "at least one over-illuminated area" refers to "single over-illuminated area" in some implementations, and "a plurality of over-illuminated area" in other implementations. In an embodiment, the at least one inaccurately-illuminated area is the at least one under-illuminated area. In another embodiment, the at least one inaccurately-illuminated area is the at least one over-illuminated area. In yet another embodiment, a first portion of the at least one inaccurately-illuminated area is the at least one under-illuminated area, and a second portion of the at least one inaccurately-illuminated area is the at least one over-illuminated area.

Optionally, the at least one inaccurately-illuminated area of the at least one image comprises one of:

a region of interest in the at least one image, a peripheral region in the at least one image, wherein the peripheral region surrounds the region of interest.

In this regard, the term "region of interest" refers to that region in the at least one image which is under a gaze of a user while viewing the at least one image. In other words, that region in the at least one image which is being currently viewed by the user is the region of interest in the at least one image. Optionally, in case of fixed foveation, the region of interest is a central region of the at least one image. Optionally, in case of active foveation, the region of interest is where the gaze of the user is focused in the at least one image. Notably, the at least one inaccurately-illuminated area of the at least one image comprising the region of interest in the at least one image implies that the region in the at least one image that is being currently viewed by the user is inaccurately-illuminated which hinders a visual quality of the at least one image. Throughout the present disclosure, the term "peripheral region" refers to that region in the at least one image which surrounds the region of interest in the at least one image. In other words, a remaining part of the at least one image after excluding the region of interest from the at least one image is the peripheral region in the at least one image. Notably, the at least one inaccurately-illuminated area of the at least one image comprising the peripheral region in the at least one image implies that the region in the at least one image that is not being currently viewed by the user is inaccurately-illuminated which hinders a visual quality of the region of interest in the at least one image. A technical effect is that the region of interest and the peripheral region are effectively taken into account in restoring the at least one inaccurately-illustrated area of the at least one image, which restores the at least one inaccurately-illustrated area in a visually immersive manner.

Optionally, the method further comprises identifying the region of interest and the peripheral region, based on a gaze direction of a user. In this regard, the term "gaze direction" refers to a direction in which the user's eye is gazing while viewing the at least one image. The gaze direction may be represented by a gaze vector. Notably, a point where the gaze direction of the user coincides with the at least one image is where the gaze of the user is fixed in the at least one image. Subsequently, the region of interest and the peripheral region are identified in the at least one image based on the gaze direction of the user. A technical effect is that the region of interest and the peripheral region are effectively and accurately identified in the at least one image based on the gaze direction of the user.

Throughout the present disclosure, the term "exposure in the at least one image" refers to a brightness level of each pixel in the at least one image. Notably, correcting the exposure in the at least one image enables to restore the at least one inaccurately-illuminated area by changing the brightness level of the pixels belonging to at least one inaccurately-illuminated area such that to replicate the lighting received by the corresponding region of the environment that is depicted in the at least one inaccurately-illuminated area. Herein, guiding the at least one image based on the low-resolution brightness map implies that the brightness level of each pixel in the at least one image is adjusted according to the low-resolution brightness map. Notably, guiding the at least one image based on the low-resolution brightness map ensures that the brightness value of each pixel in the at least one image is adjusted according to the ambient lighting conditions in which the at least one image is captured. Subsequently, by guiding the at least one image based on the low-resolution brightness map, the at least one inaccurately-illuminated area is restored as the brightness level of each pixel belonging to the at least one inaccurately-illuminated area now replicates the lighting receiving by the corresponding region in the environment that is depicted in the at least one inaccurately-illuminated of the at least one image.

Optionally, the method further comprises dynamically correcting an exposure of the region of interest in the at least one image. In this regard, the term "exposure of the region of interest" refers to brightness of each pixel in the region interest in the at least one image. Notably, the exposure of the region of interest is dynamically corrected when the at least one inaccurately-illuminated area comprises the region of interest. A technical effect is that dynamically correcting the exposure of the region of interest significantly enhances the brightness levels of that region in the at least one image that is currently under the gaze of the user, and thus, enhancing an overall visual appearance of the at least one image.

Optionally, the step of guiding the at least one image based on the low-resolution brightness map is performed using at least one neural network, wherein an input of the at least one neural network comprises the at least one image and the low-resolution brightness map, and an output of the at least one neural network comprises at least one corrected image having at least one correctly-illuminated area, and wherein the at least one neural network is continuously trained to identify and correct the at least one inaccurately-illuminated area of the at least one image. In this regard, the term "neural network" refers to a network of artificial neurons programmed such that it tries to simulate human brain, for automating the step of guiding the at least one image based on the low-resolution brightness map. It will be appreciated that the "at least one neural network" refers to "single neural network" in some implementations, and "a plurality of neural networks" in other implementations. Optionally, the at least one neural network comprise at least one of: a CNN, a UNET, a RNN, a GAN, and the like. The at least one neural network typically comprises a plurality of node layers, containing an input layer, one or more intermediate hidden layers, and an output layer, that are interconnected. Notably, the at least one image and the low-resolution brightness map being the input of the at least one neural network enables the at least one neural network to receive necessary data for performing the step of guiding the at least one image based on the low-resolution brightness map. Throughout the present disclosure, the term "corrected image" refers to the image that is generated as the output after performing the step of guiding the at least one image based on the low-resolution brightness map. It will be appreciated that the "at least one corrected image" refers to "single corrected image" in some implementations, and "a plurality of corrected images" in other implementations. Throughout the present disclosure, the term "correctly-illuminated area" refers to that area in the at least one corrected image after restoring the at least one inaccurately-illuminated area in the at least one image by performing the step of guiding the at least one image based on the low-resolution brightness map. It will be appreciated that the "at least one correctly-illuminated area" refers to "single correctly-illuminated area" in some implementations, and "a plurality of correctly-illuminated areas" in other implementations. A technical effect is that performing the step of guiding the at least one image based on the low-resolution brightness map is effectively automated, which enables an effective training of the at least one neural network to identify and correct the at least one inaccurately-illuminated area of the at least one image.

Alternatively, the step of guiding the at least one image based on the low-resolution brightness map is performed by calculating an illumination difference between pixels of the at least one image and pixels of the low-resolution brightness map. Subsequently, the at least one inaccurately-illuminated area of the at least one image is corrected using the calculated illumination difference.

The present disclosure also relates to the head-mounted display device as described above. Various embodiments and variants disclosed above, with respect to the aforementioned method, apply mutatis mutandis to the head-mounted display device.

Optionally, the at least one camera comprises a first camera and a second camera corresponding to a first eye and a second eye of a user of the head-mounted display device, respectively. In this regard, a first image may be captured using the first camera, while a second image may be captured using the second camera.

Throughout the present disclosure, the term "processor" refers to a computational element that is operable to execute instructions of the head-mounted display device. Examples of the processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, one or more individual processors, processing devices and elements are arranged in various architectures for responding to and processing the instructions that execute the instructions of the head-mounted display device.

Optionally, the low-resolution brightness map is defined as a matrix of target brightness values, one for each pixel in the at least one image, and wherein the processor is further configured to determine a given target brightness value corresponding to each pixel as one of:
    an average-brightness value that is determined using the brightness values of all pixels in any one of: the at least one image, at least one previously-captured image,
    a brightness value that is determined based on an exposure level corresponding to each pixel in any one of: the at least one image, at least one previously-captured image.

Optionally, the at least one inaccurately-illuminated area of the at least one image comprises one of:
    a region of interest the at least one image,
a peripheral region in the at least one image, wherein the peripheral region surrounds the region of interest.

Optionally, the head-mounted display device further comprises gaze-tracking means operatively coupled to the processor, wherein the processor is further configured to:
    obtain, from the gaze-tracking means, information indicative of a gaze direction of a user; and
    identify the region of interest and the peripheral region, based on the gaze direction.

In this regard, the term "gaze-tracking means" refers to a specialized equipment for detecting and/or following a gaze of the user, when the at least one image is viewed by the user. The gaze-tracking means could be implemented as contact lenses with sensors, cameras monitoring a position, a size and/or a shape of a pupil of a given eye of the user, and the like. Such gaze-tracking systems are well-known in the art.

Optionally, the processor is further configured to dynamically correct an exposure of the region of interest in the at least one image.

Optionally, the head-mounted display device further comprises an ambient light sensor, operatively coupled to the processor, for acquiring ambient light data corresponding to the ambient lighting condition in which the image is captured. In this regard, the term "ambient light sensor" refers to a sensing device that is capable of measuring and sensing the ambient light data. Examples of the ambient light sensor may include, but are not limited to photodiodes, phototransistors, Charged Coupled Devices (CCDs), Complementary Metal Oxide Semiconductor (CMOS) sensors, and the like.

Optionally, the processor is further configured to generate ambient light data, by using pre-determined data corresponding to the ambient lighting condition in which the image is captured. Optionally, the pre-determined data is pre-stored in a data repository communicably coupled to the processor.

Optionally, when guiding the at least one image based on the low-resolution brightness map, the processor is configured to use at least one neural network, wherein an input of the at least one neural network comprises the at least one image and the low-resolution brightness map, and an output of the at least one neural network comprises at least one corrected image having at least one correctly-illuminated area, and wherein the at least one neural network is continuously trained to identify and correct the at least one inaccurately-illuminated area of the at least one image.

DETAILED DESCRIPTION OF THE DRAWINGS

Referring to FIG. 1, illustrated is a flowchart depicting steps of a method for exposure correction, in accordance with an embodiment of the present disclosure. At step 102, at least one image is received. At step 104, a low-resolution brightness map associated with the at least one image is defined, corresponding to an ambient lighting condition in which the at least one image is captured. At step 106, an exposure in the at least one image is corrected, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image.

The aforementioned steps are only illustrative and other alternatives can also be provided where one or more steps are added, one or more steps are removed, or one or more steps are provided in a different sequence without departing from the scope of the claims herein.

Figure 2:
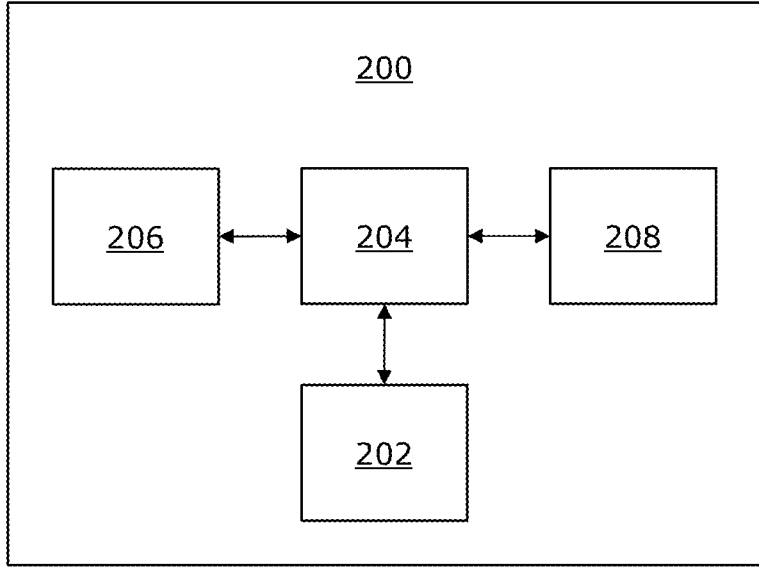
FIG. 2 is an illustration of a block diagram of a head-mounted display device, in accordance with an embodiment of the present disclosure.

Referring to FIG. 2, illustrated is a block diagram of a head-mounted display device 200, in accordance with an embodiment of the present disclosure. As shown, the head-mounted display device 200 comprises at least one camera (depicted as a camera 202). Moreover, the head-mounted display device 200 comprises a processor 204 operatively coupled to the at least one camera 202. Optionally, the head-mounted display device 200 comprises a gaze-tracking means 206 operatively coupled to the processor 204. Optionally, the head-mounted display device 200 comprises an ambient light sensor 208 operatively coupled to the processor 204.

Figure 3:
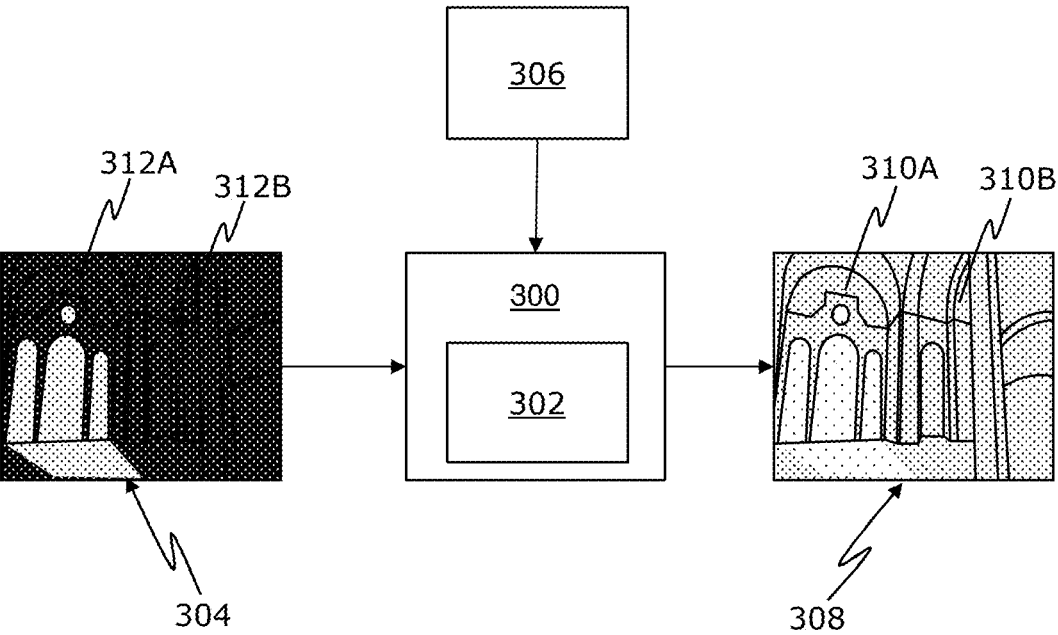
FIG. 3 is a schematic illustration of a processor configured to use at least one neural network for guiding the at least one image based on the low-resolution brightness map, in accordance with an embodiment of the present disclosure.

Referring to FIG. 3, illustrated is a schematic illustration of a processor 300 configured to use at least one neural network (depicted as a neural network 302) for guiding an at least one image (depicted as an image 304) based on a low-resolution brightness map 306. As shown, an input of the at least one neural network 302 comprises the at least one image 304 and the low-resolution brightness map 306, and an output of the at least one neural network comprises at least one corrected image 308 having at least one correctly-illuminated area (depicted as a first correctly-illuminated area 310A and a second correctly-illuminated area 310B), and wherein the at least one neural network 302 is continuously trained to identify and correct the at least one inaccurately-illuminated area (depicted as a first inaccurately-illuminated area 312A and a second inaccurately-illuminated area 312B) of the at least one image 304. Optionally, the first inaccurately-illuminated area 312A is a region of interest in the at least one image 304, and second inaccurately-illuminated area 312B is a peripheral region in the at least one image 304.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for exposure correction, the method comprising:

receiving at least one image;

defining a low-resolution brightness map, associated with the at least one image, corresponding to an ambient lighting condition in which the at least one image is captured; and correcting an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image;

wherein the low-resolution brightness map is defined as a matrix of target brightness values, one for each pixel in the at least one image, and wherein a given target brightness value corresponding to each pixel is one of:

an average-brightness value determined using brightness values of all pixels in any one of: the at least one image, at least one previously-captured image, a brightness value determined based on an exposure level corresponding to each pixel in any one of: the at least one image, at least one previously-captured image.

2. The method according to claim 1, wherein the at least one inaccurately-illuminated area of the at least one image comprises one of:

a region of interest in the at least one image, a peripheral region in the at least one image, wherein the peripheral region surrounds the region of interest.

3. The method according to claim 2, further comprising identifying the region of interest and the peripheral region, based on a gaze direction of a user.

4. The method according to claim 2, further comprising dynamically correcting an exposure of the region of interest in the at least one image.

5. The method according to claim 1, further comprising one of:

obtaining ambient light data, corresponding to the ambient lighting condition in which the at least one image is captured, for defining the low-resolution brightness map, generating ambient light data, by using pre-determined data corresponding to the ambient lighting condition in which the at least one image is captured, for defining the low-resolution brightness map.

6. A method for exposure correction, the method comprising:

receiving at least one image;

defining a low-resolution brightness map, associated with the at least one image, corresponding to an ambient lighting condition in which the at least one image is captured; and correcting an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image;

wherein the step of guiding the at least one image based on the low-resolution brightness map is performed using at least one neural network, wherein an input of the at least one neural network comprises the at least one image and the low-resolution brightness map, and an output of the at least one neural network comprises at least one corrected image having at least one correctly-illuminated area, and wherein the at least one neural network is continuously trained to identify and correct the at least one inaccurately-illuminated area of the at least one image.

7. A head-mounted display device comprising:

at least one camera for capturing at least one image; and a processor operatively coupled to the at least one camera, wherein the processor is configured to:

receive the at least one image;

define a low-resolution brightness map, associated with the at least one image, corresponding to an ambient lighting condition in which the at least one image is captured; and correct an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image;

wherein the low-resolution brightness map is defined as a matrix of target brightness values, one for each pixel in the at least one image, and wherein the processor is further configured to determine a given target brightness value corresponding to each pixel as one of:

an average-brightness value that is determined using the brightness values of all pixels in any one of: the at least one image, at least one previously-captured image, a brightness value that is determined based on an exposure level corresponding to each pixel in any one of: the at least one image, at least one previously-captured image.

8. The head-mounted display device according to claim 7, wherein the at least one inaccurately-illuminated area of the at least one image comprises one of:

a region of interest the at least one image, a peripheral region in the at least one image, wherein the peripheral region surrounds the region of interest.

9. The head-mounted display device according to claim 8, further comprising gaze-tracking means operatively coupled to the processor, wherein the processor is further configured to:

obtain, from the gaze-tracking means, information indicative of a gaze direction of a user; and identify the region of interest and the peripheral region, based on the gaze direction.

10. The head-mounted display device according to claim 8, wherein the processor is further configured to dynamically correct an exposure of the region of interest in the at least one image.

11. The head-mounted display device according to claim 7, further comprising an ambient light sensor, operatively coupled to the processor, for acquiring ambient light data corresponding to the ambient lighting condition in which the image is captured.

12. The head-mounted display device according to claim 7, wherein the processor is further configured to generate ambient light data, by using pre-determined data corresponding to the ambient lighting condition in which the image is captured.

13. A head-mounted display device comprising:

at least one camera for capturing at least one image; and a processor operatively coupled to the at least one camera, wherein the processor is configured to:

receive the at least one image;

define a low-resolution brightness map, associated with the at least one image, corresponding to an ambient lighting condition in which the at least one image is captured; and correct an exposure in the at least one image, to restore at least one inaccurately-illuminated area of the at least one image, by guiding the at least one image based on the low-resolution brightness map, wherein the at least one inaccurately-illuminated area is at least one of: at least one under-illuminated area of the at least one image, at least one over-illuminated area of the at least one image;

wherein when fusing the at least one image and the low-resolution brightness map, the processor is configured to use at least one neural network, wherein an input of the at least one neural network comprises the at least one image and the low-resolution brightness map, and an output of the at least one neural network comprises at least one corrected image having at least one correctly-illuminated area, and wherein the at least one neural network is continuously trained to identify and correct the at least one inaccurately-illuminated area of the at least one image.

* * * * *